(12) United States Patent
Baumgartner et al.

(10) Patent No.: US 12,013,070 B2
(45) Date of Patent: Jun. 18, 2024

(54) HYDRAULIC UNIT

(71) Applicant: Uniflex-Hydraulik GmbH, Karben (DE)

(72) Inventors: Carsten Baumgartner, Laubach (DE); Heidi Jarrasch, Nieder-Rosbach (DE)

(73) Assignee: UNIFLEX-HYDRAULIK GMBH, Karben (DE)

( * ) Notice: Subject to any disclaimer, the term of this patent is extended or adjusted under 35 U.S.C. 154(b) by 29 days.

(21) Appl. No.: 18/241,532

(22) Filed: Sep. 1, 2023

(65) Prior Publication Data

US 2023/0408017 A1    Dec. 21, 2023

Related U.S. Application Data

(63) Continuation of application No. PCT/EP2022/055525, filed on Mar. 4, 2022.

(30) Foreign Application Priority Data

Mar. 9, 2021 (DE) .................. 10 2021 105 591.1

(51) Int. Cl.
*F16L 57/00* (2006.01)
*F16G 11/04* (2006.01)
(Continued)

(52) U.S. Cl.
CPC .......... *F16L 55/005* (2013.01); *F16G 11/048* (2013.01); *F16G 11/14* (2013.01)

(58) Field of Classification Search
CPC ........ F16L 55/005; F16G 11/048; F16G 11/14
(Continued)

(56) References Cited

U.S. PATENT DOCUMENTS 1,324,422 A * 12/1919 Larsen ................... E01D 21/00
249/48
1,796,738 A * 3/1931 Wagner ................ F16G 11/048
24/135 R
(Continued)

FOREIGN PATENT DOCUMENTS

AU    2013101651 A4    1/2014
CN    205226703 U      5/2016
(Continued)

OTHER PUBLICATIONS

International search report issued by the European Patent Office for International Patent Application No. PCT/EP2022/055525, dated Jun. 20, 2022.

*Primary Examiner* — James F Hook
(74) *Attorney, Agent, or Firm* — Myers Wolin, LLC

(57) ABSTRACT

A hydraulic unit has a hydraulic component, a hydraulic line connected to a hydraulic connection of the hydraulic component, and a hose and fitting connected to the hydraulic connection. A tear-out preventer having a cable loop secured by a cable clamp acts on the hose. The cable clamp comprises a clamping block, which has two crossing passages and a rivet. A first passage, through which the cable is guided, has, in the region of the crossing with the second passage, a width corresponding to at least double the thickness of the cable plus the diameter of the non-deformed rivet. The second passage is configured in a stepped manner with a narrow primary portion arranged on one side of the first passage and a wide secondary portion arranged on the other side. The rivet braces the two strands of the cable against the inner wall of the first passage.

17 Claims, 2 Drawing Sheets

(51) Int. Cl.
*F16G 11/14* (2006.01)
*F16L 55/00* (2006.01)

(58) Field of Classification Search
USPC ..................................... 138/110, 96 R, 96 T
See application file for complete search history.

(56) References Cited

U.S. PATENT DOCUMENTS

| | | | | |
|---|---|---|---|---|
| 2,443,155 | A | * | 6/1948 | Zahutnik ............... F16G 11/146 |
| | | | | 24/136 L |
| 3,197,240 | A | | 7/1965 | Lindberg |
| 3,644,966 | A | | 2/1972 | Higgins |
| 3,813,733 | A | | 6/1974 | Flohr |
| 5,269,342 | A | * | 12/1993 | Portis ................. F16L 55/1152 |
| | | | | 137/849 |
| 6,393,670 | B1 | * | 5/2002 | Bealmear ............... F16G 11/046 |
| | | | | 24/129 B |
| 11,111,627 | B1 | * | 9/2021 | Petersen ................. F16G 11/14 |
| 2014/0007383 | A1 | * | 1/2014 | Corman ................. F16G 11/14 |
| | | | | 24/115 F |
| 2019/0063659 | A1 | | 2/2019 | Gamba | |

FOREIGN PATENT DOCUMENTS

| | | |
|---|---|---|
| CN | 205689963 U | 11/2016 |
| DE | 8703122 U1 | 6/1987 |
| DE | 4324943 A1 | 1/1995 |
| DE | 202004003544 U1 | 5/2004 |
| EP | 0728982 A1 | 8/1996 |
| EP | 2193304 B1 | 3/2012 |
| EP | 2867559 B1 | 2/2016 |
| EP | 3144574 A1 | 3/2017 |
| FR | 616730 A | 2/1927 |
| WO | 2006100702 A1 | 9/2006 |

* cited by examiner

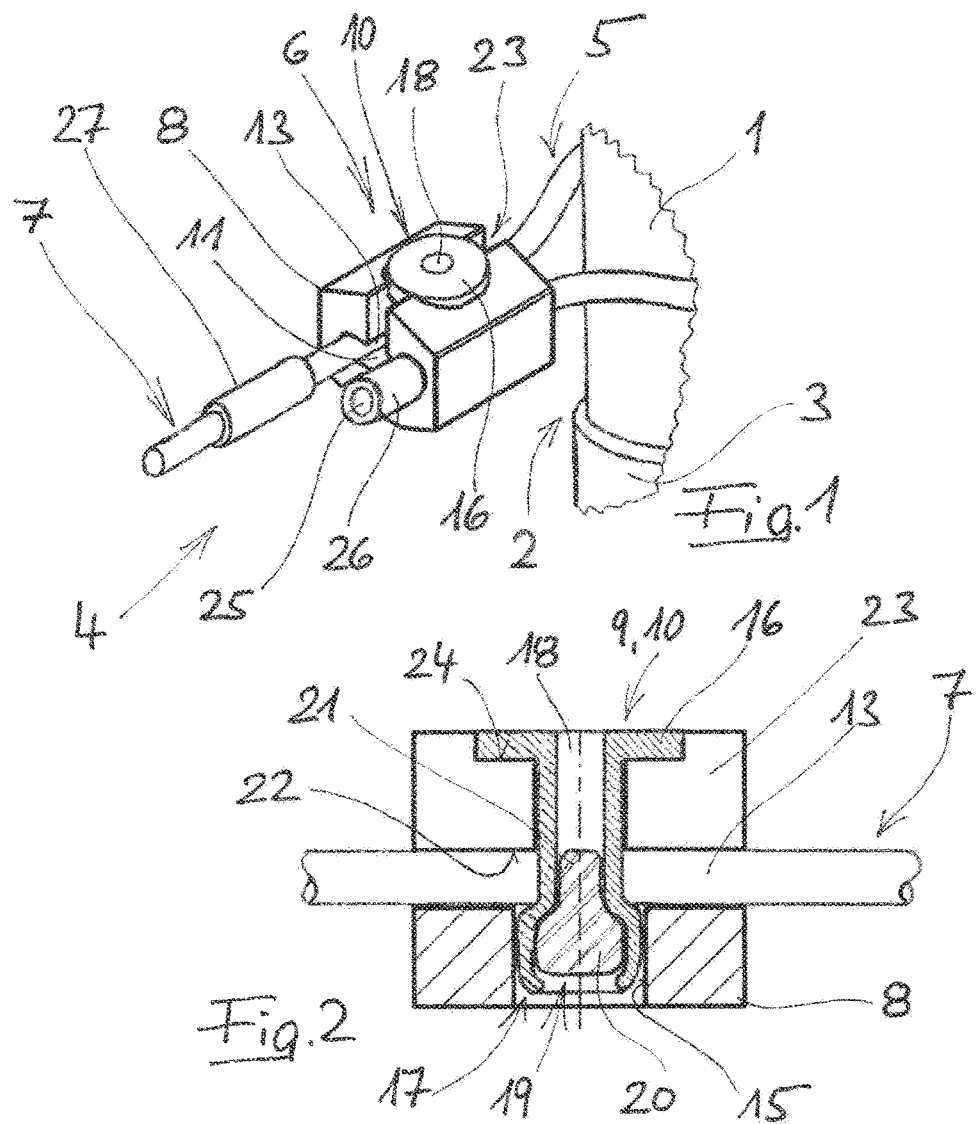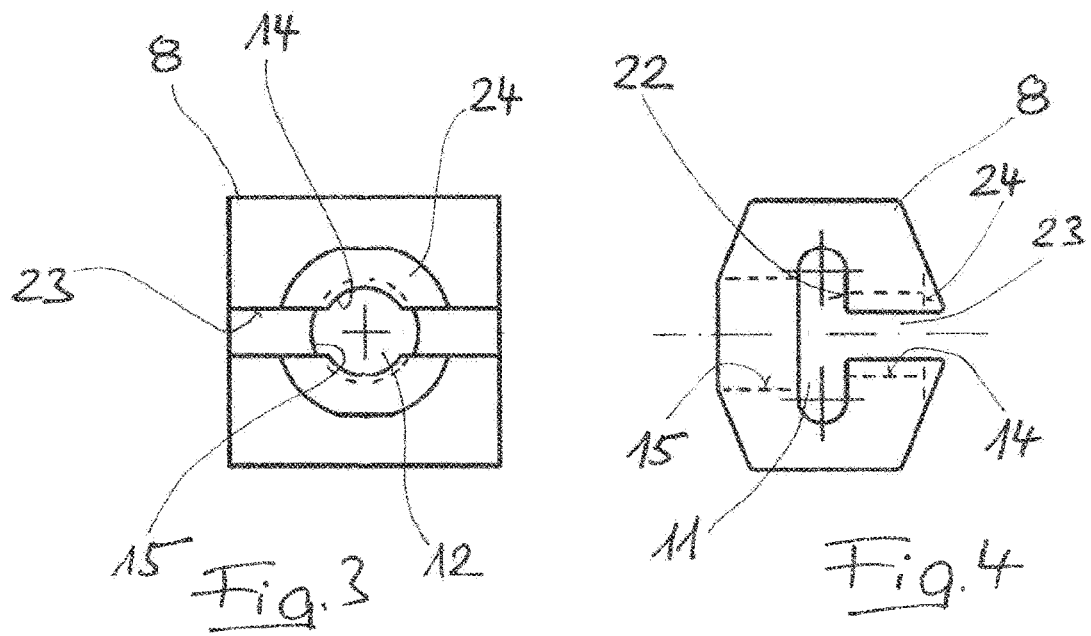

HYDRAULIC UNIT

CROSS REFERENCE TO RELATED APPLICATIONS

This application is a continuation under 35 U.S.C. § 120 of International Application PCT/EP2022/055525, filed Mar. 4, 2022, which claims priority to German Application No. 10 2021 105 591.1, filed Mar. 9, 2021, the contents of each of which are incorporated by reference herein.

FIELD OF THE INVENTION

The present invention relates to a hydraulic unit, comprising a hydraulic component and a hydraulic line connected to a hydraulic connection of the hydraulic component, which comprises a hydraulic hose and a fitting joined thereto connected to the hydraulic connection of the hydraulic component, wherein a pull-out-protection device with a rope sling secured by means of a rope clamp engages on the hydraulic hose.

BACKGROUND

Hydraulics have become an integral part of many areas of technology. The low-loss power transmission between a hydraulic transmitter (e.g., hydraulic pump) and a hydraulic receiver (e.g., hydraulic motor, hydraulic cylinder) with high power density with spatial independence of the transmitter and receiver and easily controllable technology of the components offers a unique combination of advantages. With regard to the movability of the hydraulic transmitter and the hydraulic receiver relative to each other, their fluid connection is regularly (at least partially) realized by means of a hydraulic hose, i.e., via a flexible pipe. The hydraulic hose in question is typically joined using fittings on the end side. In this respect, radial pressing by means of appropriate radial presses has proven to be particularly effective (cf. the product range of Uniflex Hydraulik GmbH, Karben).

Despite the high achievable quality, reliability and safety of known joints, a pull-out-protection device is expedient or even mandatory for various applications. This applies in particular to particularly high hydraulic pressures, especially in systems with hydraulic accumulators or continuous oil delivery pumps. In such a case, tearing out the hydraulic hose from the fitting leads to the end of the hydraulic hose torn out of the assigned fitting lashing around, resulting in a considerable danger to people in the vicinity. Hydraulic hose pull-out-protection devices that can be used in this context are sold, for example, by Hydraulik Schmitz Siegen GmbH (under the Cable Lock® brand) (see also EP 2 867 559 B1). Other hydraulic units given at the beginning, each with a hydraulic hose pull-out-protection device of the type of interest here (with rope sling), are known from EP 2 193 304 B1, WO 2006/100702 A1, CN 205226703 U, CN 205689963 U, DE 20 2004 003 544 U1, EP 3 144 574 A1, U.S. Pat. Nos. 3,197,240 A and 3,813,733 A. US 2019/0063659 A1 also discloses a hydraulic unit of the type. Here, the rope sling is secured due to the interaction of the rope clamp, which encloses the rope in question in a braking/moveable manner, with a stopper fixed on the rope; if the rope is subjected to a correspondingly high tensile load, the rope sling is slowed down, i.e., tightened under energy dissipation. With regard to hydraulic hose pull-out-protection devices designed elsewhere, reference should be made to AU 2013101651 A4, DE 43 24 943 A1 and EP 0 728 982 A1.

FR 616 730 A discloses a rope clamp that can be used for detachable fixation of a rope sling formed from a rope. The rope clamp comprises a slotted terminal block with a C-shaped cross-section. A wedge is inserted between the two sections of the rope forming the rope sling, which—via intermediate pieces secured against being pulled out of the terminal block—spreads the said rope sections outwardly against the inner wall of the terminal block limiting anything from passing through. The wedge is secured in the terminal block by means of a clamping screw.

From DE 87 03 122 U1 a clamping/tensioning device for traction devices is known, which can also be used for the detachable fixation of a rope sling formed from a rope. The clamping/tensioning device comprises a base body with a transverse slot and a bore hole opening in it. In this bore hole, the threaded shaft of a hook, eye or eyelet screw is received, through the hook, eye or eyelet of which the two rope sections forming the rope sling are passed. By tightening a nut screwed onto the free end of the threaded shaft of the hook, eye or eyelet screw projecting from the base body, the rope is clamped in the transverse slot of the base body.

U.S. Pat. No. 3,644,966 A discloses yet another clamping/tensioning device suitable for the detachable fixation of a rope sling formed from a rope. The clamping/tensioning device comprises a base body with two parallel rope bore holes, through which the rope can be passed. Between the two rope bore holes, perpendicular to the plane defined by them, a bore hole extends through the base body, in which a toggle that can be rotated around its axis is held. The toggle comprises a flat cross-sectional profile in such a way that in a first rotation position the rope can be moved through the respective rope bore hole, whereas, in a second rotation position of the toggle, it clamps the two rope sections in the respective rope bore hole.

SUMMARY

In light of the prior art presented, the present disclosure is aimed at providing a hydraulic unit of the type specified above, in which the hydraulic hose pull-out-protection device is characterized by increased practicality with respect to prior art. In addition to reliability (including compliance with reproducible behaviour in the event of being triggered), various aspects of handling (e.g., need for different components for different applications, time required for installation, risk of application errors, etc.) are to be regarded as particularly relevant in this respect.

According to the present disclosure, the problem specified above may be solved by a hydraulic unit as described herein. Accordingly, a hydraulic unit is characterized by a hydraulic hose pull-out-protection device, in which the rope clamp comprises a terminal block comprising two intersecting passages and a rivet, wherein a first of the two passages, through which the rope is passed in the form of a rope sling placed around the hydraulic hose, has a width in the area of the junction with the second passage that corresponds to at least twice the thickness of the rope plus the diameter of the undeformed rivet (in this area); the second passage is designed in a stepped manner with a narrow primary section arranged on one side of the first passage and a wide secondary section arranged on the other side of the first passage, and the rivet with an expanded end section braces the two strands of the rope passed through the terminal block of the rope clamp against the inner wall of the first passage surrounding the mouth of the primary section of the second passage.

To fix the rope sling, the rivet that penetrates the terminal block in its second passage between the two rope strands is axially compressed and expanded in its area located in the (wide) secondary section of the second passage. If a rivet designed as a blind rivet is preferred, this is done by means of the head of the pulling mandrel—pulled in the direction of the rivet head or the (narrow) primary section of the first passage. The collar formed by the process of compression and expansion presses with axial force component on the two strands of rope located on both sides of it and clamps them against the opposite surface of the first passage, i.e., against the inner wall of the first passage adjacent to the mouth of the primary section of the second passage. This has the effect that the two strands of the rope passed through the rope clamp are securely fixed in the sense that they can only move within the terminal block under considerable force. In the absence of such an action of significant forces, the geometry of the rope sling remains unchanged.

One advantage of the described hydraulic unit is the extremely low risk of misuse. This is because manually tightening clamping screws (cf. EP 2 867 559 B1) or the like are not provided for in the hydraulic hose pull-out-protection device used in the embodiments described. Rather, the clamping of the rope provides a rivet (in particular, a blind rivet) in which a certain clamping force can be set within comparatively narrow tolerances implemented during manufacturing (in particular, by designing the pull mandrel with a predetermined breaking point matched to a defined breakaway force). This makes it possible to adjust the rope clamp in such a way that the rope sling is sufficiently fixed (see above) as long as the hydraulic hose pull-out-protection device is not triggered, but reliably tightens around the hydraulic hose in the event of being triggered. This is an aspect of high relevance insofar as it allows the rope sling to be placed comparatively loosely or loosely around the hydraulic hose during normal operation of the hydraulic unit. This counteracts damage to the hydraulic hose caused by a rope sling rubbing against it. In all other respects, the pull-out-protection device used in the hydraulic unit described herein is also characterized by a high level of application safety and, simultaneously, particularly easy application when attached to the hydraulic line in a minimum of time. The intuitively correct installation of the rope clamp benefits the correct attachment and use of the pull-out-protection device. There are also minimal requirements for the tooling; if the rivet is designed as a blind rivet, a standard riveting tongs are sufficient. In addition, a wide range of applications can be covered with a very small number of different components for the respective pull-out-protection device so that there is only a minimal storage requirement.

A first preferred further embodiment of the hydraulic unit is characterized by the fact that the terminal block is slotted parallel or at least substantially parallel to the first passage in such a way that the slot opening in question allows the rope strands to be inserted into the first passage from the side. By inserting the rope into the first passage from the side, there is no need to thread the rope through the first passage (twice), wherein, in particular, the second threading of the free end of the rope through the first passage next to the rope strand already extending through it can be tedious. In addition, such a slotted embodiment of the terminal block allows the use of prefabricated ropes equipped with stoppers attached to them (see below). The intuitively correct handling (see above) of the pull-out-protection device can also benefit from this further embodiment; this is because the slot opening—which serves to insert the two rope strands of the rope sling—specifies the "operating side" of the rope clamp, from which—if appropriately designed—the rivet designed as a blind rivet must also be inserted and the riveting tongs is to be applied.

The slot opening, the clear width of which should normally be less than the width of the first passage, may have a clear width at least slightly above twice the diameter of the rope; this allows the simultaneous insertion of the two rope strands of a preformed rope sling from the side. However, the clear width of the slot opening is particularly preferable so that the two rope strands are to be inserted one after the other from the side through the slot opening into the first passage of the rope clamp. In this sense, a relatively narrow slot opening is particularly favourable, also with regard to good guidance of the rivet. The minimum width of the slot opening is slightly above the diameter of the rope.

Being particularly preferred, the slot opening encounters the first passage approximately in the middle of it in such a way that the terminal block—on a plane perpendicular to the first passage—has an approximately C-shaped cross-section. In this context, it is also favourable if the primary section of the second passage aligns with the slot opening of the terminal block. The resulting symmetry of the force distribution has a positive effect on the operating behaviour in typical applications. Regardless of its individual cross-sectional shape, it can be favourable from a manufacturing point of view if the terminal block is manufactured by cutting a terminal block blank to length from a profile bar—for example produced by means of extrusion.

Other attractive aspects from the point of view of avoiding assembly errors concern a (e.g., colour) marking of the rivet and/or terminal block. In particular, for a specific application (e.g., a certain rope diameter), coordinated components (terminal block and rivet matching it) can be marked with the identical colour so that intuitively correct pairings are selected, wherein the corresponding (colour) marking of the respective rope is also particularly favourable in this respect. A direct visual assembly inspection is also possible by (identical) colour coding of the rivet head and the side of the terminal block from which the rivet is to be inserted into it. Other marking of the relevant side of the terminal block (e.g., by means of grooves, scoring or similar superficial structuring) can also be favourable in this sense, i.e., to avoid assembly errors, wherein, intuitively, detectable symbols (e.g., a circle for the rivet head) can be used. The rivet head and/or the terminal block—as parts of a relevant safety-related device—may also be designed in the corresponding warning or signal colour. And by means of a respective colour (rivet and/or terminal block), the assembly year can also be coded to facilitate compliance with schedules for testing or renewal.

Another way to eliminate assembly errors is to pre-assemble the entire pull-out-protection device at the factory, comprising rope and rope clamp(s), wherein the rope can already be laid into a rope sling and the rivet may be inserted into the terminal block in question. The prepared rope sling is pushed from the end over the hydraulic line, i.e., via the fitting to the hydraulic hose, where it is tightened more loosely or tightly depending on the requirements and fixed into position by means of the rope clamp.

According to another preferred further embodiment of the hydraulic unit described, the rope sling has a free end projecting from the terminal block with a stopper fixed on it. The stopper prevents the free end of the rope from being pulled through the terminal block (and accordingly, the rope sling from opening) in the event of such high forces acting on the rope sling that the clamping force exerted by the rivet on it is not (or no longer) sufficient to fix the rope strands in place so that the latter can move within the terminal block, which is quite desirable with regard to tightening the rope sling under load (see above). In a particularly preferred embodiment, a buffer is arranged between the terminal block and the stopper around the rope. This can be designed, for example, as a helical spring, disc-spring assembly, elastomer spring or the like and dampens a possible impact of the stopper on the terminal block in the event of a slipping rope.

Another preferred further embodiment of the hydraulic unit is characterized by the fact that the rope of the pull-out-protection device is designed as an endless rope, wherein a rope sling is provided on both sides. In this case, the tightening of the rope sling(s) explained above cannot be easily implemented. On the other hand, there are other advantages, such as increased tear resistance.

For typical applications, it is favourable if the first passage has an oval cross-section, particularly by limiting its cross-section by two semicircles and two straight stretches of distance extending between them. This results in favourable force flow conditions within the terminal block.

According to yet another preferred further embodiment of the hydraulic unit, the terminal block comprises a recess on its outer surface in the vicinity of the mouth of the secondary section of the second passage, in which a head of the rivet is at least partially held. This is not only favourable in terms of providing surfaces that are as smooth as possible, i.e., avoiding unnecessary projecting structures. This also proves to be very favourable from the point of view of handling the parts when mounting the pull-out-protection device. This is because the recess incorporated into the surface of the terminal block makes it immediately and clearly visible from which direction the rivet is to be inserted into the first passage. Incorrect operation is intuitively excluded.

Another preferred further embodiment of the hydraulic unit is characterized by the fact that in the area of the sling the rope is covered by a flexible sheathing. This sheathing is preferably loosely pushed onto the rope so that there is some play between it and the rope. By means of such a sheathing, the risk of damage to moving hydraulic lines due to pull-out-protection devices that rub against them can be further reduced. If the material is suitable, the sheath can also be used to increase the friction of the rope sling on the hydraulic hose—which is tightened in the event of being triggered- and in this way the holding force that can be transferred to it by the pull-out-protection device.

In a particularly preferred embodiment of the hydraulic unit, stoppers are fixed on the rope at regular intervals (e.g., every 15 cm), i.e., inseparable and permanently attached (e.g., by means of compression). In the case of a rope that is pre-assembled at the factory, i.e., equipped with stoppers, there is no need to carry out the safety-relevant (see above) attachment of a stopper provided at the free end of the rope on site, meaning under workshop conditions. This is favourable from the point of view of maximum reliability. The stoppers fixed on the rope are preferably dimensioned in such a way that they still fulfil their holding function even if they are halved. In this way, the rope can be cut to length in the area (in the middle) of a stopper, and the two resulting ends are already equipped with functional stoppers. If the stoppers are formed by press sleeves pressed onto the rope by means of radial pressing, it is favourable from a manufacturing point of view if they are notched in a V-shape at the end side, i.e., on at least one end side, for example by cutting a pipe to length by shearing off a V-shaped shear edge. The V-shaped notched geometry makes it substantially easier to thread the rope into the precision sleeve bore hole.

In the context of the hydraulic unit, it may be provided that the rope, instead of being continuous, consists of at least two sections connected to each other by a spring. Such an embodiment is suitable for contributing to the reduction of hard, sudden stresses on the pull-out-protection device itself and the component to which it is attached. Within the scope of the present invention, the component to which the pull-out-protection device is attached is, in particular, the fitting assigned to the end of the hydraulic line secured by means of the pull-out-protection device. The pull-out-protection device can also be attached to the hydraulic component to which the hydraulic line is connected.

With regard to the material of the components used for the pull-out-protection device, it should be noted that for most typical applications, a rope designed as a wire cable and a terminal block made of steel are well suited; and the rivet is typically made of aluminium alloy, in the case of a blind rivet with a pull mandrel made of steel. However, other materials can also be used for certain applications, such as a rope made of Kevlar or other high-strength synthetic fibre material for example; and for the terminal block, it can also be made of a—possibly filled—engineered plastic.

BRIEF DESCRIPTION OF THE DRAWING

In the following, the present invention is explained in more detail on the basis of a preferred exemplary embodiment illustrated in the drawing. The figures show:

FIG. 1 is a pull-out-protection device that acts on the hydraulic hose of a hydraulic line, FIG. 2 is a longitudinal section through the pull-out-protection device in accordance with FIG. 1 in the area of the terminal block, FIG. 3 is the terminal block of the rope clamp (without rivet) of the pull-out-protection device in accordance with FIGS. 1 and 2 in top view from above and FIG. 4 is a face-side view of the terminal block in accordance with FIG. 3; furthermore, FIG. 5 as an example, illustrates the use of the pull-out-protection device in accordance with FIGS. 1 to 4 as part of a hydraulic unit.

DETAILED DESCRIPTION OF THE PREFERRED EMBODIMENTS

Figure 5:
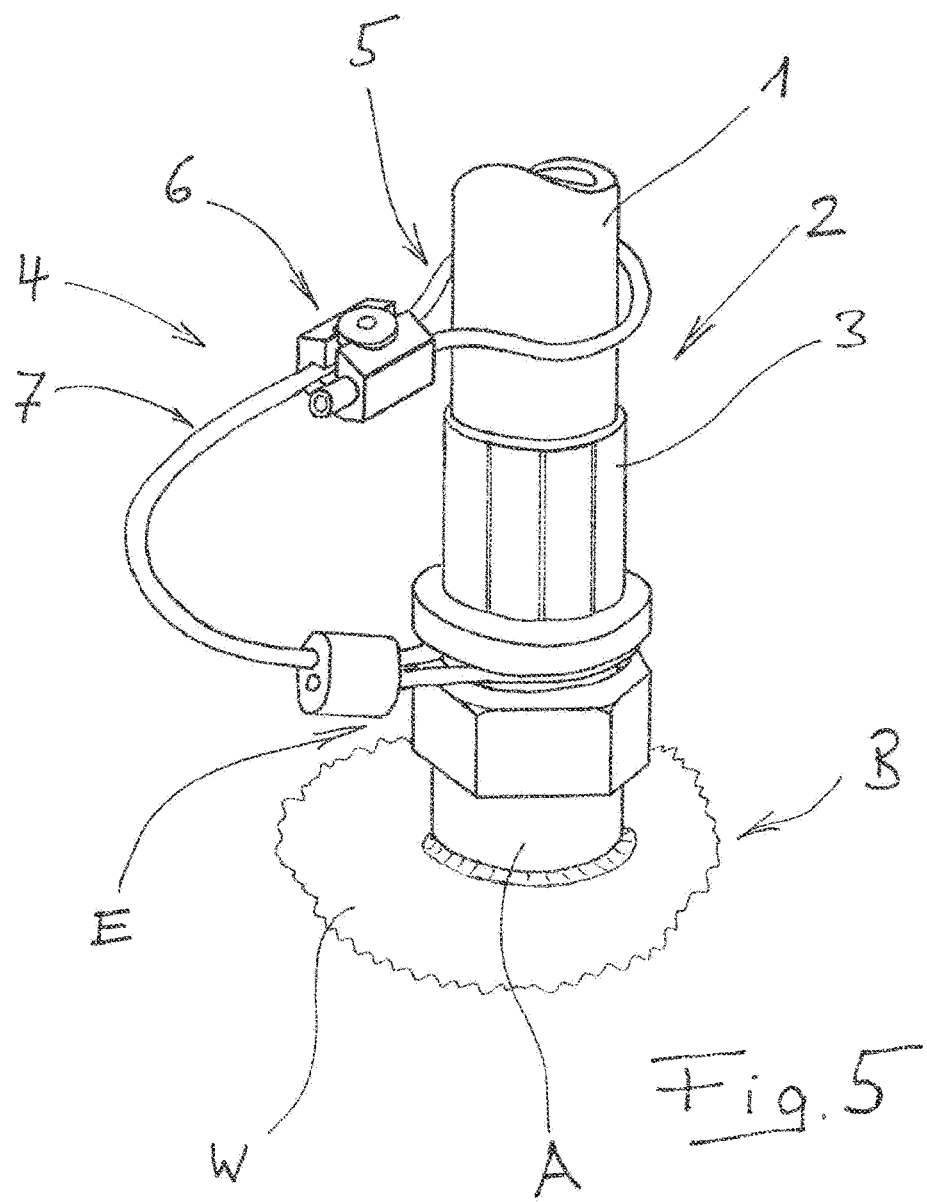

In accordance with FIG. 1, a pull-out-protection device 4 engages the hydraulic hose 1 of a hydraulic line 2, which is connected to the hydraulic connection of a hydraulic component (not shown) and is provided for this purpose with a fitting 3 pressed on the end side. This includes a rope sling 5 placed around the hydraulic hose 1, which is secured by means of a rope clamp 6. The other end of rope 7—designed as a wire cable—from which the rope sling 5 is formed may, depending on the individual circumstances, be attached to fitting 3 or to the hydraulic component in a manner known as such.

The rope clamp 6 comprises a terminal block 8 made of steel and a rivet designed as a blind rivet 9. The terminal block 8 comprises two intersecting passages 11, 12. The rope 7 is guided through a first passage 11 twice, which has an oval cross-section, namely—by forming it into the rope sling 5. Thus, in the first passage 11, two rope strands 13 are taken up. In the second passage 12—which crosses the first passage 11 orthogonally—rivet 10 is included in such a way that it extends between the two rope strands 13. In the area of the intersection with the second passage 12, the first passage 11 has a width equal to at least twice the thickness of the rope 7 plus the diameter of the undeformed rivet 10.

The second passage 12 is designed in a stepped manner in the sense that the two sections separated by the first passage 11 have different diameters. Thus, the second passage 12 has a narrow primary section 14 arranged on one side of the first passage 11 and a wide secondary section 15 arranged on the other side of the first passage 11. The orientation of rivet 10 in the second passage 12 is such that its undeformed area adjacent to the rivet head 16 intersperses the primary section 14 of the second passage 12, whereas its end section 17 facing away from the rivet head 16 is located in the secondary section 15. The end section 17 of rivet 10 is expanded—by means of the pulling mandrel 19 drawn into bore hole 18 of rivet 10 in the direction of the rivet head 16, from which in FIG. 2 only the head 20 with shaft stub 21 remaining in rivet 10, torn off the shaft, is shown. It fills the secondary section 15 of the second passage 12 and braces the two rope strands 13 passing through the terminal block 8 against the inner wall 22 of the first passage 11 surrounding the mouth of the primary section 14 of the second passage 12.

In order to be able to insert the rope 7 from the side into the terminal block 8, it is slotted parallel to the first passage 11, namely on its side showing the primary section 14 of the second passage 12. The corresponding slot opening 23 aligns with the primary section 14 of the second passage 12 and intersects through it. On a plane perpendicular to the first passage 11, the terminal block 8 therefore has a C-shaped cross-section (see FIG. 4). On its surface, terminal block 8 comprises a recess 24 around the mouth of the primary section 14 of the second passage 12, which corresponds to the rivet head 16 so that it is recessed in the said recess 24.

The free end 25 of the rope sling 5, i.e., the end of the rope 7 that is not attached to the hydraulic component or fitting 3, projects a little out of the terminal block 8. A stopper 26 is firmly attached to it, which safely prevents the pulling through of the terminal block 8 of the free end 25 of the rope 7. The stopper 26 is formed by a half, i.e., in the middle severed pressing sleeve 27, as they are fixed at regular intervals on the rope 7.

In accordance with FIG. 5, the pull-out-protection device 4 shown in FIGS. 1 to 4 forms part of an exemplarily illustrated hydraulic unit. In addition to the parts described above, this includes a hydraulic component in the form of a tank B symbolized by a section of the tank wall W and having a hydraulic connection A. The second end E of the rope 7 is attached here—again via a sling—exemplarily to the fitting 3 of the hydraulic line 2, which is connected to the hydraulic connection A of the tank B as intended in a known manner.

What is claimed is:

1. A hydraulic unit comprising:
   a hydraulic component and a hydraulic line (2) connected to a hydraulic connection of the hydraulic component, which comprises a hydraulic hose (1) and a fitting (3) connected to the hydraulic connection of the hydraulic component,
   wherein a pull-out-protection device (4) with a rope sling (5) secured by means of a rope clamp (6) engages on the hydraulic hose (1),
   wherein the rope clamp (6) comprises a terminal block (8) with two intersecting passages (11, 12) and a rivet (10), wherein:
   a first of the two passages (11), through which the rope (7) in the form of the rope sling (5) has been guided, has a width equal to at least twice the thickness of the rope (7) plus the diameter of the undeformed rivet (10) in the area of the intersection with a second passage (12) of the two passages,
   the second passage (12) is designed in a step-shaped manner with a narrow primary section (14) arranged on one side of the first passage (11) and a wide secondary section (15) arranged on the other side of the first passage (11), and
   the rivet (10) with an expanded end section (17) braces the two strands (13) of the rope (7) passing through the clamping block (8) against the inner wall (22) of the first passage (11) surrounding the mouth of the primary section (14) of the second passage (12).

2. The hydraulic unit of claim 1, wherein the terminal block (8), being at least substantially parallel to the first passage (11), is slotted in such a way that the slot opening in question (23) permits the insertion of the rope strands (13) into the first passage (11) from the side.

3. The hydraulic unit of claim 2, wherein the terminal block (8) has a C-shaped cross-section on a plane perpendicular to the first passage (11).

4. The hydraulic unit of claim 2, wherein the primary section (14) of the second passage (12) aligns with the slot opening (23) of the terminal block (8).

5. The hydraulic unit of claim 1, wherein the rope sling (5) comprises a free end (25) projecting from the terminal block (8) with a stopper (26) fixed on it.

6. The hydraulic unit of claim 5, wherein a buffer is arranged between the terminal block (8) and the stopper (26) around the rope (7).

7. The hydraulic unit of claim 1, wherein the rope (7) of the pull-out protection device (4) is designed as an endless rope, wherein a rope sling (5) is provided on both sides.

8. The hydraulic unit of claim 1, wherein the first passage (11) of the terminal block (8) comprises an oval cross-section.

9. The hydraulic unit of claim 1, wherein a head (16) of the rivet (10) is at least partially accommodated in a corresponding recess (24) provided on the surface of the terminal block (8).

10. The hydraulic unit of claim 1, wherein the rivet (10) is designed as a blind rivet (9).

11. The hydraulic unit of claim 1, wherein in the area of the rope sling (5) the rope (7) is sheathed by means of a flexible sheathing.

12. The hydraulic unit of claim 1, wherein stoppers, in the form of press-on sleeves (27) for example, are fixed on the rope (7) at regular intervals.

13. The hydraulic unit of claim 1, wherein the rope (7) consists of at least two sections connected by a spring.

14. The hydraulic unit of claim 1, wherein the pull-out-protection device (4) is attached to the fitting (3).

15. The hydraulic unit of claim 1, wherein the pull-out-protection device (4) is attached to the hydraulic component.

16. The hydraulic unit of claim 1, wherein the rivet (10) or the terminal block (8) are marked in a colour-coded manner or marked by means of surface structuring.

17. The hydraulic unit of claim 16, wherein a terminal block (8) corresponding to a particular rope diameter and a rivet (10) corresponding to it are marked with the identical colour.

* * * * *